(12) United States Patent
Wettergard

(10) Patent No.: US 6,405,686 B1
(45) Date of Patent: Jun. 18, 2002

(54) MOISTENER FOR INTAKE AIR OF INTERNAL COMBUSTION MACHINES WITH TURBOCHARGING

(75) Inventor: Jan Wettergard, Kungsängen (SE)

(73) Assignee: Munters Euroform GmbH, Aaehen (DE)

( * ) Notice: Subject to any disclaimer, the term of this patent is extended or adjusted under 35 U.S.C. 154(b) by 0 days.

(21) Appl. No.: 09/636,675

(22) Filed: Aug. 11, 2000

(30) Foreign Application Priority Data

Aug. 12, 1999 (DE) .......................................... 199 38 292

(51) Int. Cl.[7] .............................................. F02B 47/00
(52) U.S. Cl. ........................................ 123/25 A; 60/599
(58) Field of Search ............................ 123/25 A, 25 B, 123/25 D; 60/599

(56) References Cited

U.S. PATENT DOCUMENTS 4,557,222 A * 12/1985 Nelson ...................... 123/25 B \* cited by examiner

*Primary Examiner*—Noah P. Kamen
(74) *Attorney, Agent, or Firm*—Herbert Dubno

(57) ABSTRACT

Described is a device for moistening the inlet air of internal combustion engines having a turbo-supercharger. The device comprises moistening means through which the inlet air and the moistening liquid flow and contact with one another. The moistening means is disposed upstream or the compressor of the turbo-supercharger in flow direction of the inlet air. In the flow path of the inlet air upstream of the moistening means an air/air heat exchanger is disposed which serves for preheating the inlet air and which is flown through by the atmospheric inlet air and the moistened and compressed inlet air from the compressor.

11 Claims, 2 Drawing Sheets

MOISTENER FOR INTAKE AIR OF INTERNAL COMBUSTION MACHINES WITH TURBOCHARGING

FIELD OF THE INVENTION

The present invention relates to a device for moistening the inlet air or internal combustion engines having turbo-superchargers.

BACKGROUND OF THE INVENTION

It is known to moisten the inlet air of Diesel engines provided with turbo-superchargers in order to reduce the Nox content of the exhaust gas. Such a method with corresponding device is described in WO 95/23286. In this known device a moistening means is traversed by the inlet air and water, wherein the inlet air, prior to its moistening, is compressed by the compressor of the turbo-supercharger and the energy inherent in the cooling water of the exhaust gases of the internal combustion engine is used for preheating the water before the same is introduced into the moistening means. Accordingly, in this case compressed air is moistened.

OBJECT OF THE INVENTION

It is the object of the invention to provide a device for moistening the inlet air of an internal combustion engine with a turbo-supercharger with which the Nox reduction in the exhaust gas of the internal combustion engine is achieved in an especially simple manner at especially low cost.

This object is achieved by a device for moistening the inlet air of an internal combustion engines having a turbo-supercharger and which comprises:

- a moistening means through which the inlet air and the moistening liquid flow and contact one another and which is disposed upstream of the compressor of the turbo-supercharger in a flow direction of the inlet air; and
- an air/air heat exchanger disposed upstream of the moistening means in the flow direction of the inlet air, serving for preheating the inlet air and traversed by the atmospheric inlet air and the moistened and compressed inlet air of the compressor.

Accordingly, with the inventive solution the inlet air is moistened in a non-compressed condition. In order to enable such a moistening, the inlet air is preheated prior to passing the moistening means for which the compressed inlet air leaving the compressor of the turbo-supercharger and already moistened by the moistening means is used. The preheating is realized by means of an air/air heat exchanger traversed by the compressed inlet air. The compressed inlet air, heated not only by the realized preheating but also by the compression in the compressor, transfers a part of its thermal energy to the atmospheric inlet air in the air/air heat exchanger and is thus cooled. Accordingly, cooled and compressed air is introduced into the internal combustion engine.

The invention is particularly directed to Diesel engines or gas engines which, however, does not exclude that it can be used with other engines also.

The moistening of the inlet air in the moistening means is carried out adiabaticly.

The air/air heat exchanger can be a known intercooler with aircooling already existing with internal combustion engines.

For example, the air in the compressor of the turbocharger is heated to a temperature in a range of 150–200° C. by the carried out compression process. In the preheating step the atmospheric inlet air is heated by the heated compressed air to a temperature range of 35–120° C. Simultaneously the heated compressed air is cooled from 150–200° C. to about 90–100° C. The corresponding moistening is carried out according to the invention without heating of the moistening medium (water).

According to a further development of the invention another moistening means is disposed upstream of the air/air heat exchanger in the flow direction of the inlet air, a heating device for the inlet air being disposed upstream of this moistening means. Accordingly, with this embodiment a first preheating of the inlet air by means of the above-mentioned heating device takes place which is followed by a moistening of the inlet air. Thereafter, the inlet air is again heated (second preheating) through the air/air heat exchanger by means of the compressed inlet air whereafter the inlet air is again moistened. Both moistening means are adiabatic moistening means.

Preferably, the heating device for the inlet air is an air/water heat exchanger for transferring the thermal energy of the cooling water of the internal combustion engine to the inlet air. The air/water heat exchanger can be traversed directly by the cooling water or an additional water circuit can be disposed therebetween.

According to an alternative embodiment the heating device is formed by an air/air heat exchanger serving for the transfer of the thermal energy of the exhaust gas of the combustion engine to the inlet air. Of course, with this embodiment a water circuit can also be interposed.

The compressed, moistened air leaving the air/air heat exchanger can be further especially cooled and/or once again moistened. Normally, a cooling is desired since the compressed air leaving the air/air heat exchanger is still too hot. So, an embodiment of the invention provides that a cooling device is interposed in the flow path of the compressed and moistened inlet air between the air/air heat exchanger and the combustion engine. For this, a normal intercooler, can be used.

Accordingly to another alternative a third moistening means is disposed in the flow path of the compressed and moistened inlet air between the air/air heat exchanger and the internal combustion engine. By this, an additional moistening and cooling of the inlet air is achieved. Preferably, the third moistening means is associated with a heat exchanger for heating the moistening medium (water). This embodiment corresponds to the embodiment described in WO 95/23286 according to which the moistening means flown through by compressed air is applied with heated water for the moistening and the heating of the water is carried out by means of a water/water heat exchanger of water/air heat exchanger which is traversed either by the cooling water or by the exhaust gas of the internal combustion engine.

Normally, an air filter is disposed upstream of the air/air heat exchanger in the flow path of the inlet air. However, for relieving the air filter the same can be disposed downstream of the moistening means in the flow path of the inlet air. With this embodiment a part of the impurities is already discharged through the moistening means.

The device according to the invention is especially used with Diesel engines of ships, boats and other vehicles. The Diesel engines of such vehicles frequently have a sea water circuit (salt water circuit) the water of which is either used itself for the cooling of the Diesel engine or serves for cooling the cooling water through a heat exchanger is the fresh water cooling. If such a sea water circuit is existing the moistening means is (are) appropriately applied with salt water either so that no special fresh water source is necessary. The salt water can be intercepted and recirculated to the conduit leading to the moistening means.

Of course, this does not exclude that river water or tap-water can be used instead of salt water.

The above-mentioned cooling device is appropriately controlled in response to the pressure of the turbo-supercharger in order to avoid condensation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
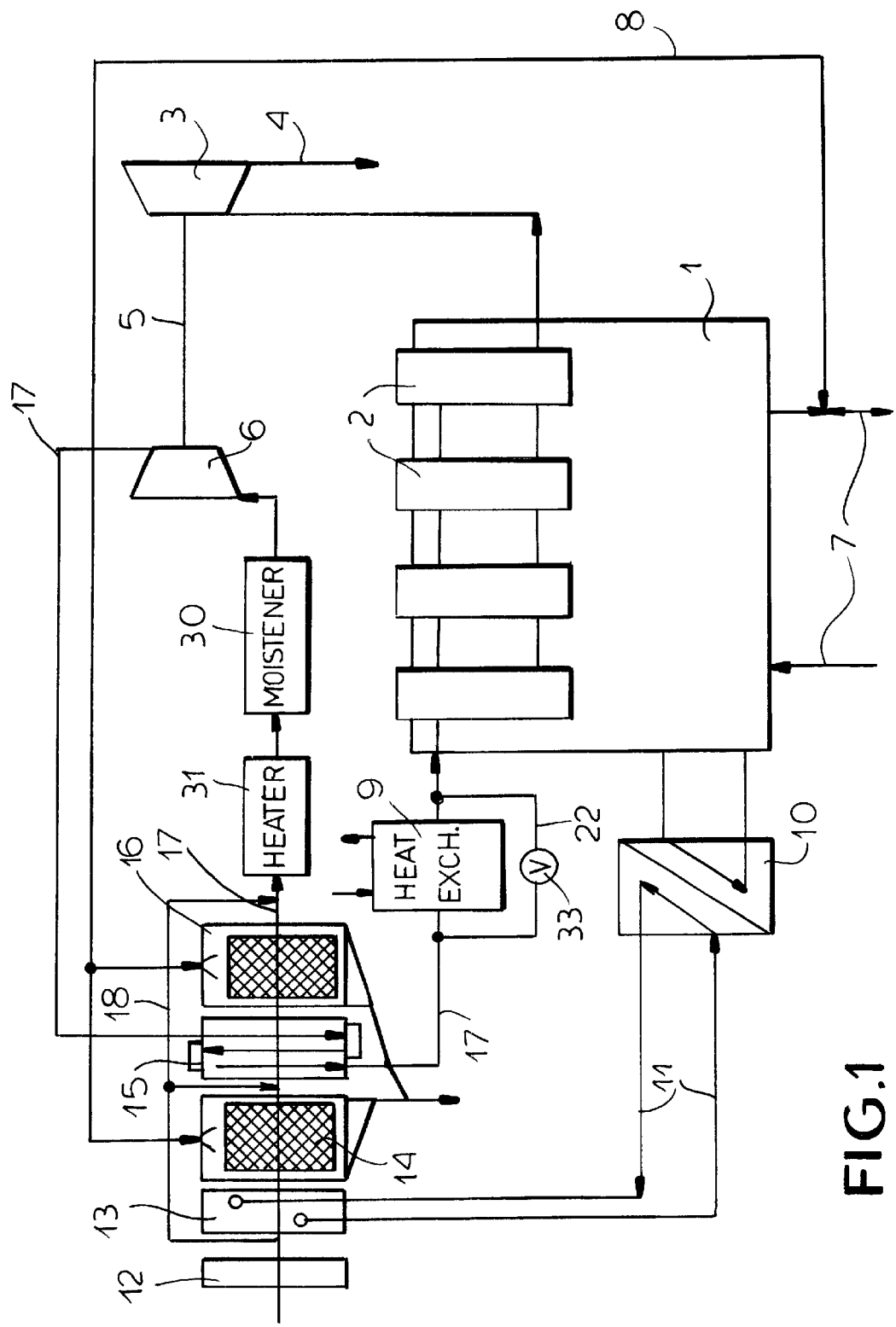
FIG. 1 shows a schematic representation of a moistening device with a Diesel engine.

The Diesel engine 1 shown in FIG. 1 is a ship engine with four cylinders 2. The exhaust gas of the internal combustion engine 1 is discharged at 4 and drives a turbine 3 which is part of a turbo-supercharger. Furthermore, the turbo-supercharger comprises a compressor 6 driven by the turbine through a shaft 5. The compressor 6 serves for compressing the inlet air of the Diesel engine which is led to the respective cylinders 2 by means of a flow path shown at 17.

Atmospheric inlet air enters the compressor 6 through an air filter 12. An air/water heat exchanger 13, a second moistening means 14, an air/air heat exchanger 15 and a first moistening means 16 are disposed in this sequence from the air filter 12 to the compressor 6 in the flow path 17 of the inlet air. The inlet air passes the air/water heat exchanger 13 and is heated. In the following air/air heat exchanger 15 it is reheated, and in the following moistening means 16 an additional moistening is carried out before the inlet air enters the compressor 6.

The compressed and moistened air discharged by the compressor 6 flows through the flow path 17 into the air/air heat exchanger 15 where it transfers a part of its thermal energy to the inlet air flowing to the heat exchanger. The compressed cooled air leaves the heat exchanger 15 and flows into an intercooler 9 in which it is cooled once more. Then, the air is led to the cylinders 2 of the Diesel engine 1.

The ship engine shown here has a sea water circuit (salt water circuit) 7 serving for cooling the engine. From this circuit 7 salt water is branched off through a branch conduit 8 and is led to the two moistening means 14 and 16. The moistening means have a packing bed traversed by salt water from above to below wherein the salt water is sprayed onto the packing bed by means of suitable nozzles. The packing bed is traversed in cross flow by the inlet air wherein the same takes up corresponding moisture.

A device for separating entrained salt particles can be disposed in the flow path 17 of the inlet air downstream of the moistening means in order to prevent entrainment of salt particles into the cylinders of the internal combustion engine.

A water/water heat exchanger 10 is disposed in the cooling water circuit of the Diesel engine. The heat exchanger 10 serves for transferring the thermal energy inherent in the cooling water to a water circuit 11. This water circuit contains the above-mentioned air/water heat exchanger 13 for preheating the inlet air. The heated water flowing through the circuit 11 flows through the tube coils of the heat exchanger 13 and heats the inlet air flowing around the tube coils.

The exhaust gas of the Diesel engine can serve for preheating the inlet air also. Accordingly, the heat exchanger 13 can be also an air/air heat exchanger.

Figure 2:
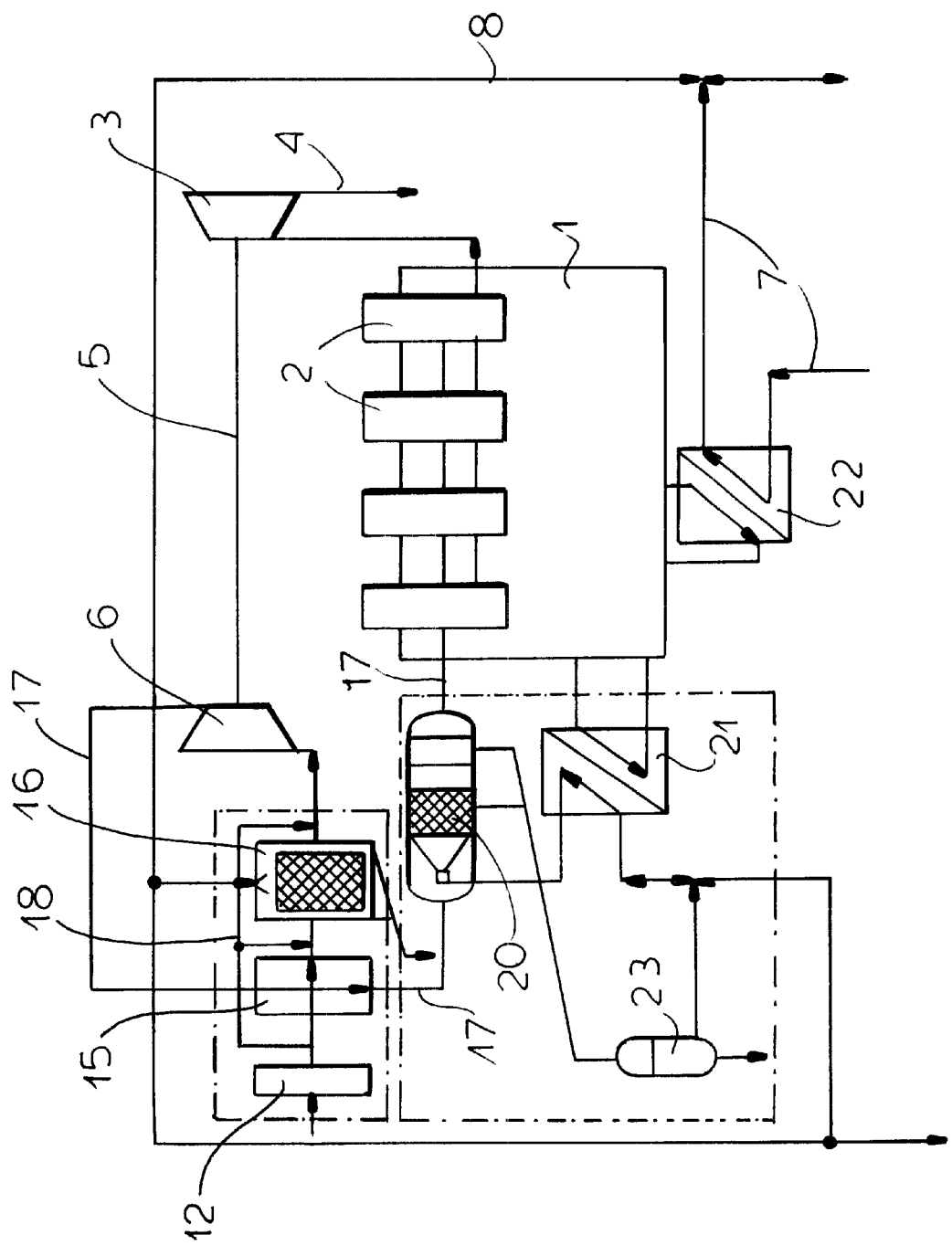
FIG. 2 shows a schematic representation of another embodiment of a moistening device with a Diesel engine.

Moreover, FIG. 2 shows a ship Diesel engine 1 with four cylinders 2 having a turbo-supercharger consisting of a turbine 3 driven by the exhaust gas, a compressor 6 and a shaft 5 for driving the compressor. Also in this embodiment the flow path of the inlet air for the internal combustion engine is designated with 17. Moreover, identical reference numbers designate identical parts as in FIG. 1.

The atmospheric inlet air passes, in this sequence up to the compressor 6, an air filter 12, an air/air heat exchanger 15 and a moistening means 16 therebehind. The air is preheated in the air/air heat exchanger 15 and is moistened in the moistening means 16. It is compressed in the compressor 6, then led through the heat exchanger 16 for preheating the inlet air and finally led through another processing stage before introducing into the internal combustion engine.

Also with this embodiment salt water is used for moistening the inlet air in the moistening means 16. The salt water is branched off a sea water circuit (salt water circuit) 7 through a branch conduit 8. According to this embodiment fresh water is used for cooling the internal combustion engine 1, the fresh water passing a water/water heat exchanger 22 in which it is cooled by the sea water of the sea water circuit 7. The cooling water passes another heat exchanger 21 which is a component of the additional processing stage which is described in the following.

The additional processing stages for the compressed and moistened inlet air has a third moistening means 20 which is formed as a horizontal container with a packing bed. The packing bed is traversed by the inlet air and by fresh water (parallel flow or cross flow) wherein the compressed inlet air is moistened which, after having passed the moistening means 20, is led to the cylinders 2 of the internal combustion engine 1. The water used for moistening flows from the moistening means 20 into a storage container 23 and from there again into the moistening means through the heat exchanger 21. In the heat exchanger 21 it is heated by the cooling water of the internal combustion so that compressed air and heated water are contacted with one another in the moistening means 20.

FIG. 2 shows an embodiment according to which the whole water circuit is a salt water circuit, i.e. also the residual salt water of the branch conduit 8 is led through the heat exchanger 21. Accordingly, both moistening means are operated with salt water. Only the cooling water circuit is a fresh water circuit.

The embodiment shown in FIG. 2 is suited for cases according to which an especially high moistening of the inlet air is desired.

Not only in FIG. 1 but also in FIG. 2 a bypass line 18 is shown in which an appropriate mixing valve is provided to enable bypassing of the stages 13, 14, 15 and 16. The bypass line 18 includes one branch conduit or a plurality of branch conduits opening into the main flow path of the air between the several stages.

Of course, in addition to the stages 13, 14 further stages can be disposed upstream of the heat exchanger 15. For example, a particle separator for dust particles, salt particles etc. can be provided additionally.

According to another alternative another moistening means 30 is provided downstream of the moistening means 16 and upstream of the compressor 6 in flow direction of the inlet air, a heating device 31 for the inlet air being disposed upstream of this moistening means. By these measures the temperature difference can be increased at the air/air heat exchanger—compared with the solution according to which the other moistening means and the heating device for the inlet air are disposed upstream of the air/air heat exchanger—whereby the heat transfer at this heat exchanger is improved and a smaller heat exchanger can be used. However, the risk of condensation can be greater with this solution.

In order to reduce this risk of condensation it is suggested as inventive variant to dispose a bypass line 32 with bypass valve 33 between the inlet and the outlet of the cooling device 9. In this manner the actual humidity of air can be controlled in such a manner that no condensation takes place.

What is claimed is:

1. An internal combustion engine comprising:

a plurality of cylinders generating an exhaust gas;

a turbo-supercharger connected to said cylinders and having a turbine receiving said exhaust gas and driven thereby, and a compressor for compressing air to be fed to said cylinders and driven by said turbine;

an air/air heat exchanger;

a first conduit connected to said air/air heat exchanger for supplying atmospheric air thereto for heating in said air/air heat exchanger, a second conduit connecting said compressor to said air/air heat exchanger for supplying compressed air heated by said compressor to said air/air heat exchanger whereby said compressed air is cooled, a third conduit connected to said air/air heat exchanger for delivering compressed air to said cylinders, and a fourth conduit for delivering heated atmospheric air; and a moistener upstream of said compressor and downstream of said air/air heat exchanger, said moistener being connected to a source of water, to said fourth conduit and to said compressor for moistening heated atmospheric air delivered by said fourth conduit and supplying moistened heated atmospheric air to said compressor for compression therein.

2. The internal combustion engine defined in claim 1, further comprising another moistener disposed upstream of said air/air heat exchanger and connected thereto by said first conduit and heating means for inlet air supplied to said another moistener disposed upstream thereof and supplying the atmosphering air thereto.

3. The internal combustion engine defined in claim 1, further comprising another moistener disposed between said compressor and the moistener upstream thereof and a heater upstream of said another moistener and traversed by the heated atmospheric air delivered by said fourth conduit.

4. The internal combustion engine defined in claim 1, wherein an air/water heat exchanger is provided along a path of air supplied to said compressor and receives cooling water of the engine for transferring heat energy of the cooling water to air supplied to said compressor.

5. The internal combustion engine defined in claim 1, further comprising a flow device connected between said third conduit and said cylinders.

6. The internal combustion engine defined in claim 5, further comprising a bypass line with a valve connected across an inlet and an outlet of said cooling device.

7. The internal combustion engine defined in claim 1, further comprising another moistener connected between said third conduit and said cylinders.

8. The internal combustion engine defined in claim 7, wherein said another moistener is provided with a heat exchanger for heating a moistening medium supplied to said another moistener.

9. The internal combustion engine defined in claim 1, further comprising an air filter connected to said first conduit of said air/air heat exchanger.

10. The internal combustion engine defined in claim 1, further comprising a cooling circulation connected to said cylinders and supplied with cooling water, said cooling circulation including a heat exchanger for cooling the cooling water.

11. The internal combustion engine defined in claim 10, wherein said heat exchanger is supplied for cooling said cooling water is supplied with sea water.

* * * * *